(No Model.)

6 Sheets—Sheet 1.

W. D. GRAY.
GRADUAL REDUCTION MACHINE FOR GRAIN, &c.

No. 311,829.

Patented Feb. 3, 1885.

Attest
Sidney P. Hollingsworth
Newton Wyckoff

Inventor:
William D. Gray
By his attorney
Philip T. Dodge (No Model.)

W. D. GRAY.
GRADUAL REDUCTION MACHINE FOR GRAIN, &c.

No. 311,829. Patented Feb. 3, 1885.

6 Sheets—Sheet 2.

Attest.
Sidney P. Hollingsworth
Newton Wyckoff.

Inventor.
William D. Gray.
By his Attorney,
Philip T. Dodge.

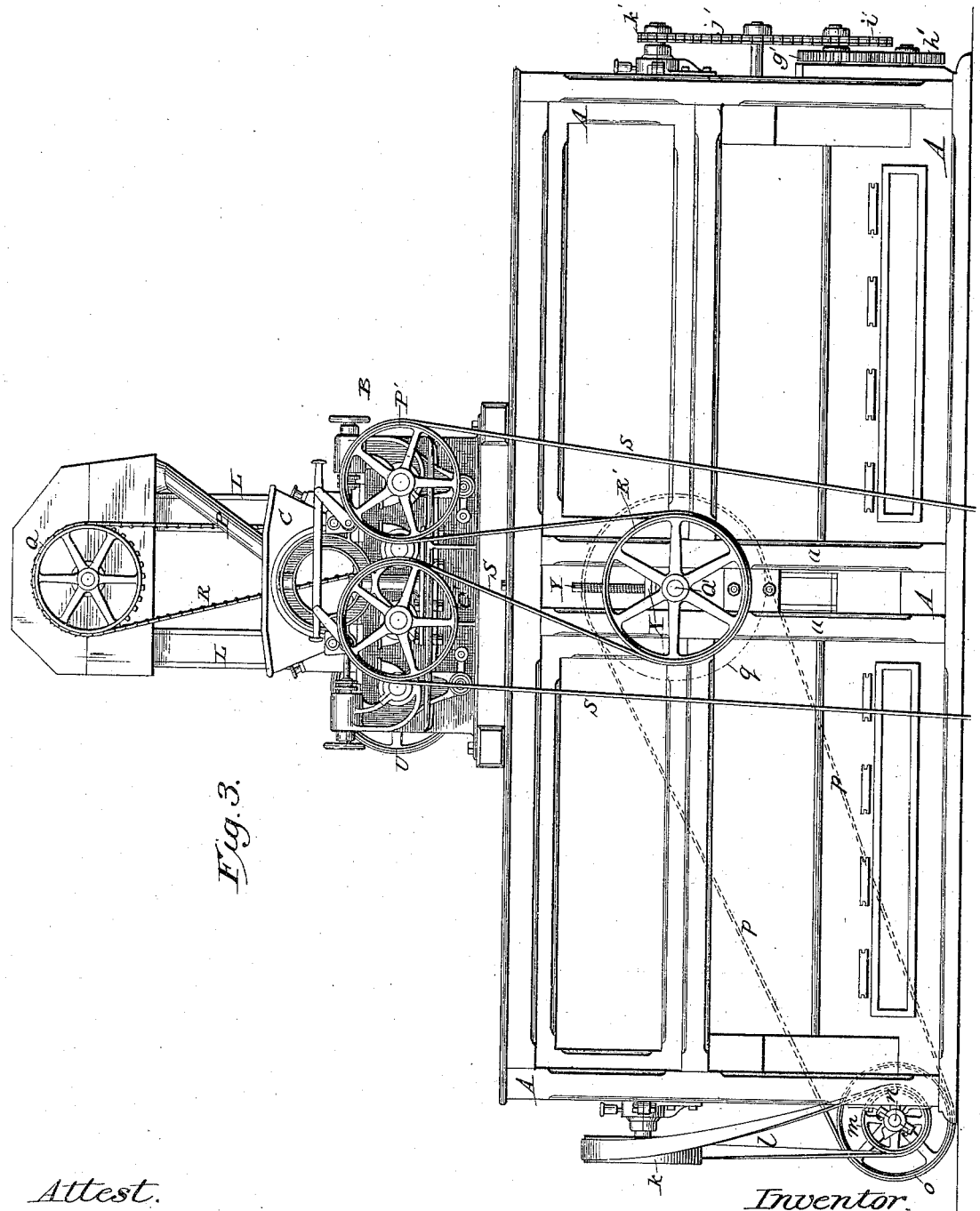

(No Model.) 6 Sheets—Sheet 4.
W. D. GRAY.
GRADUAL REDUCTION MACHINE FOR GRAIN, &c.
No. 311,829. Patented Feb. 3, 1885.
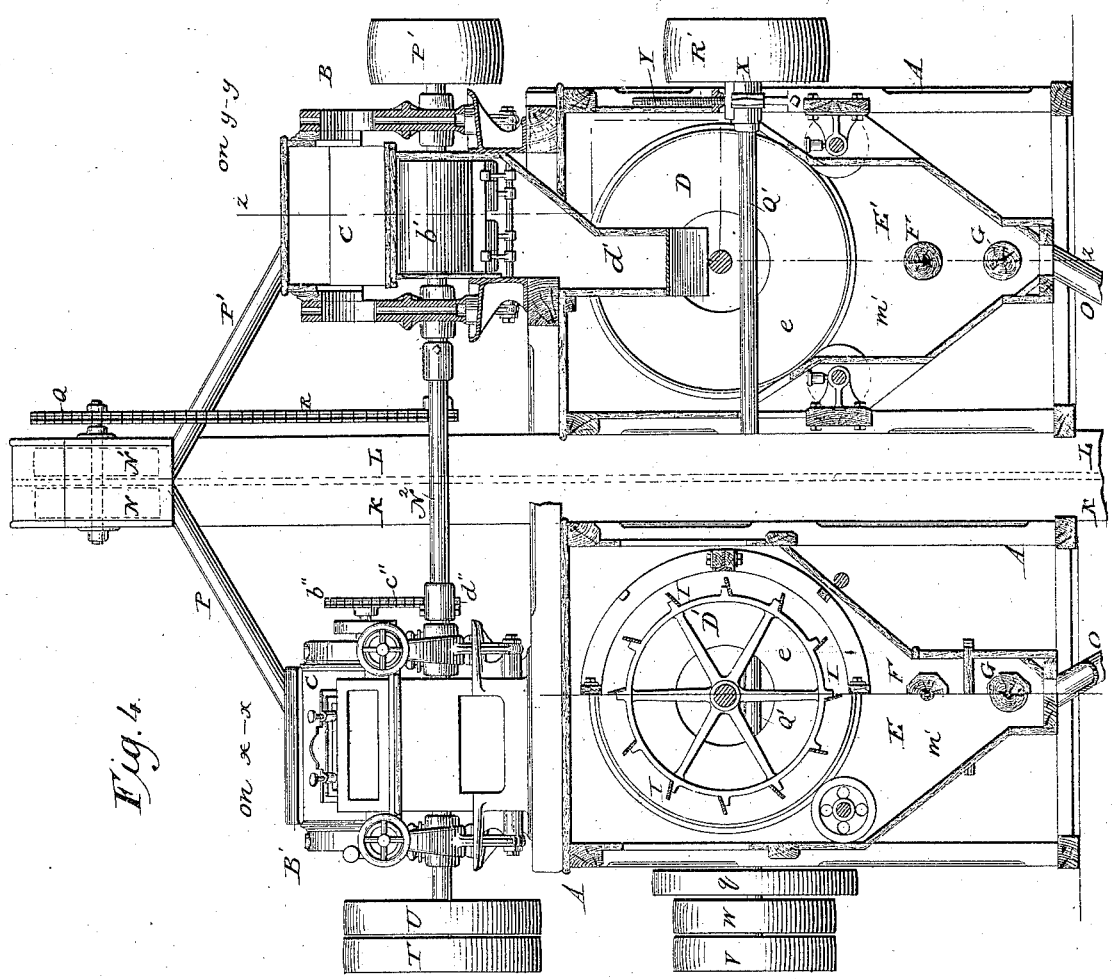
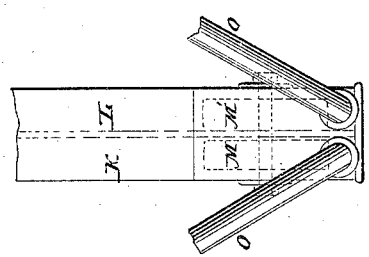

(No Model.) 6 Sheets—Sheet 5.
W. D. GRAY.
GRADUAL REDUCTION MACHINE FOR GRAIN, &c.
No. 311,829. Patented Feb. 3, 1885.
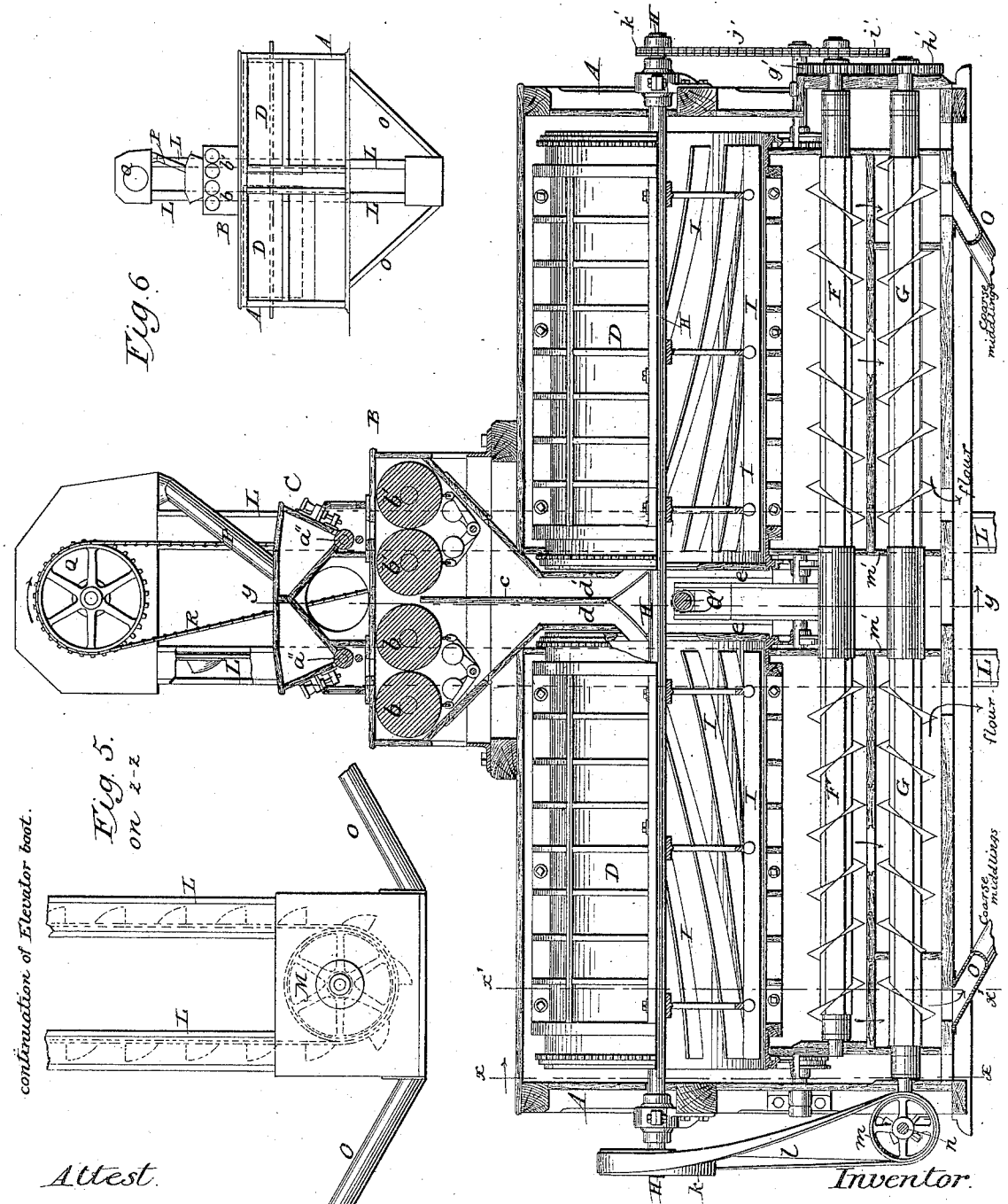
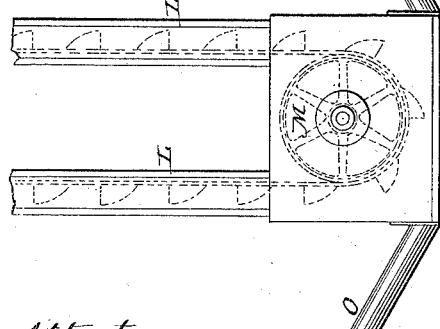
Attest.
Sidney P. Hollingsworth
Newton Wyckoff.
Inventor.
W. D. Gray
By his Attorney
Philip T. Dodge.

(No Model.)  6 Sheets—Sheet 6.
W. D. GRAY.
GRADUAL REDUCTION MACHINE FOR GRAIN, &c.
No. 311,829.  Patented Feb. 3, 1885.
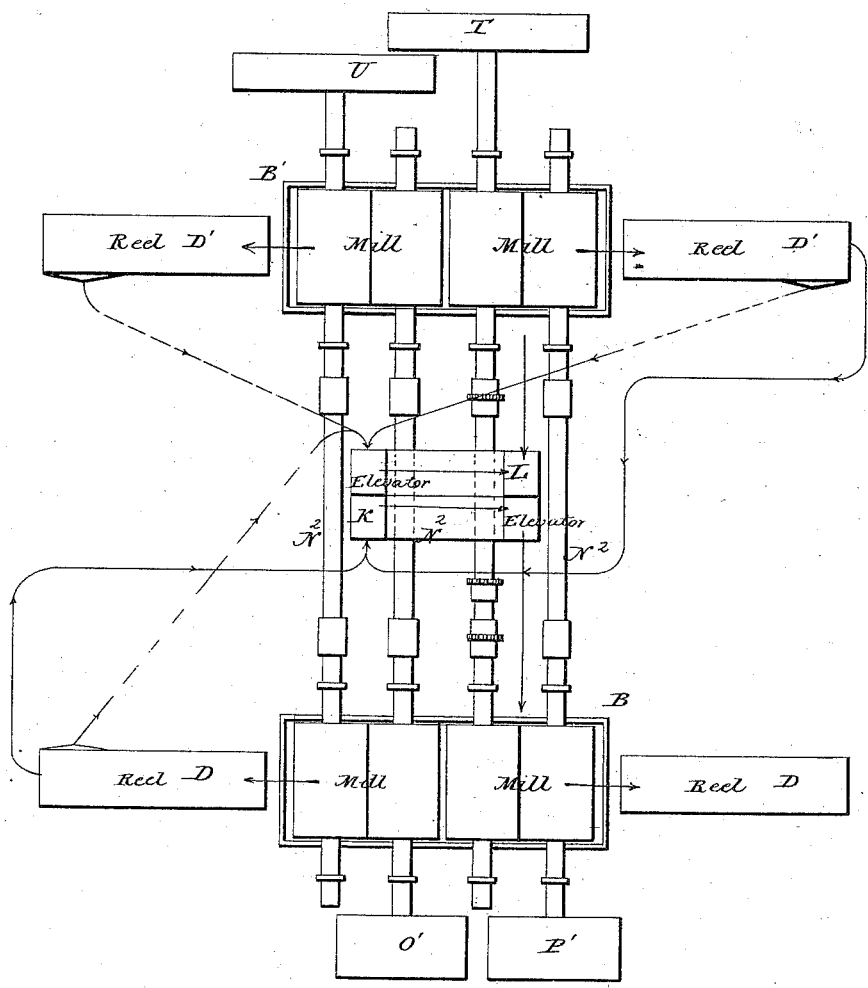

UNITED STATES PATENT OFFICE.

WILLIAM DICKSON GRAY, OF MILWAUKEE, WISCONSIN.

GRADUAL-REDUCTION MACHINE FOR GRAIN, &c.

SPECIFICATION forming part of Letters Patent No. 311,829, dated February 3, 1885.

Application filed October 3, 1883. Renewed October 1, 1884. (No model.)

*To all whom it may concern:*

Be it known that I, WILLIAM D. GRAY, of Milwaukee, in the county of Milwaukee and State of Wisconsin, have invented certain Improvements in Gradual-Reduction Machines for Grain, &c., of which the following is a specification.

This invention relates to that class of apparatus commonly known in the art as "gradual-reduction machines," designed to effect successive reductions of grain or grain products with intermediate separations or gradations of the material.

The invention consists in various details of construction, hereinafter described and claimed, having reference to the roller-mills for effecting the reduction, the rotating reels for effecting the separation, and conveyers, elevators, and other devices for effecting the delivery of the material from one portion of the apparatus to another.

Figure 1:
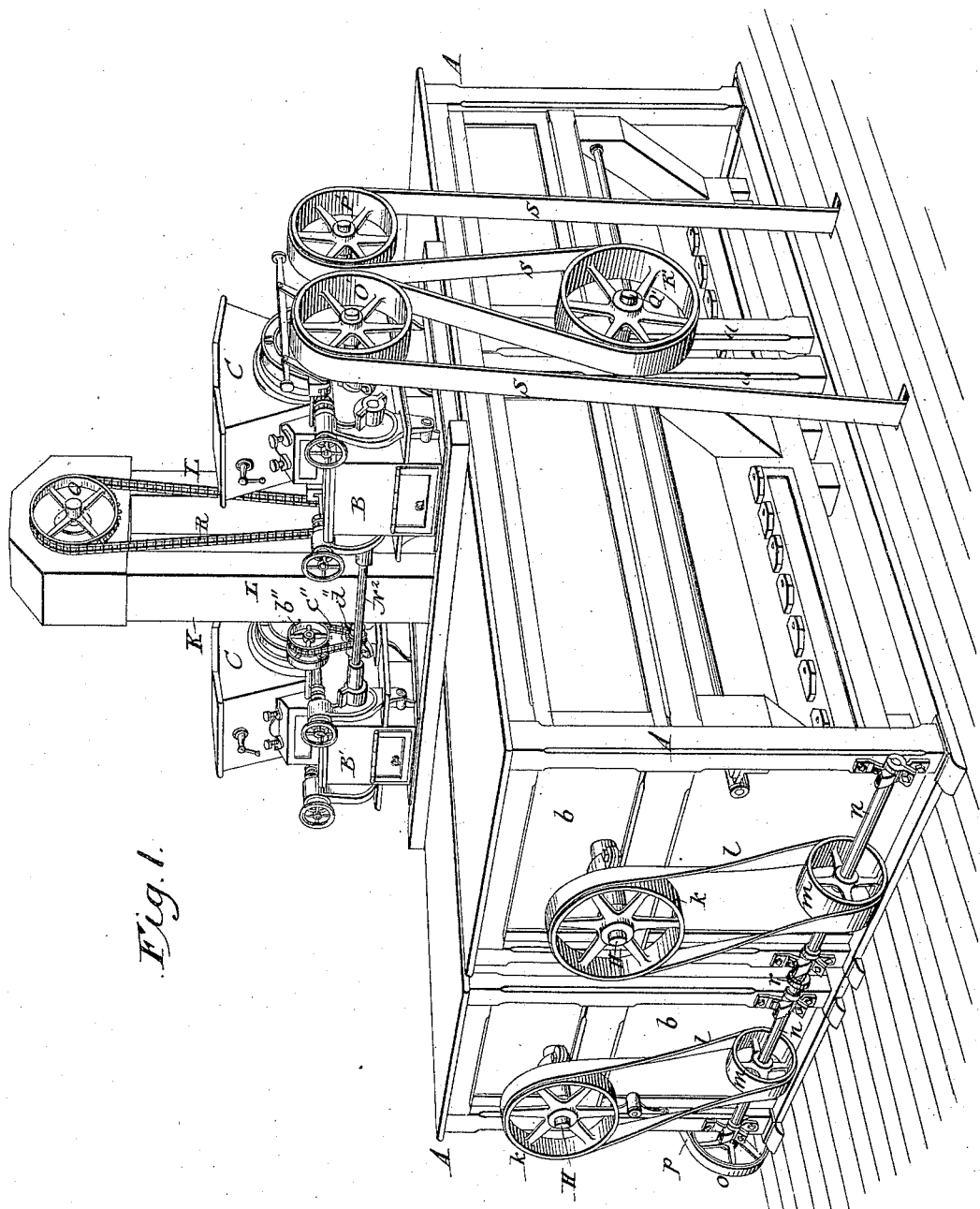
Figure 2:
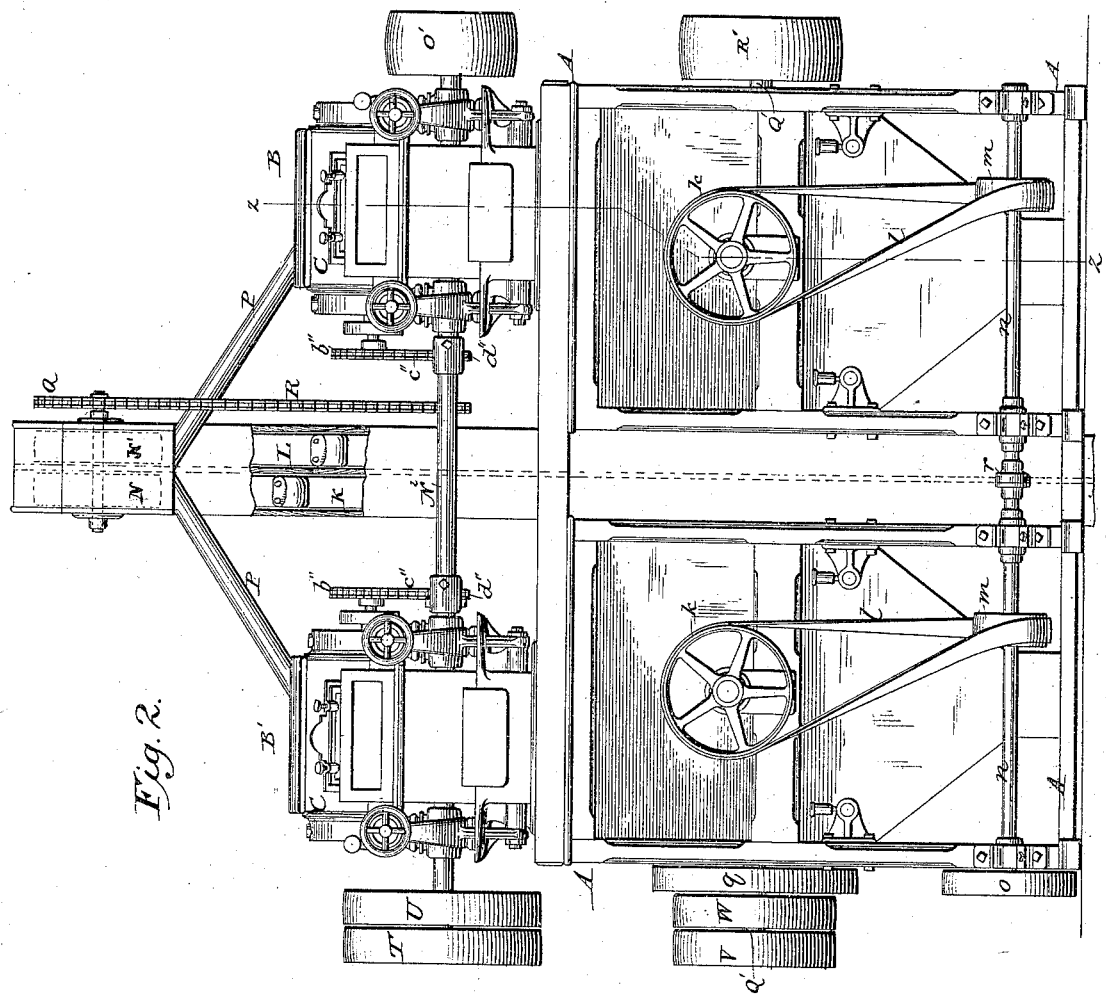

Referring to the accompanying drawings, Figure 1 represents a perspective view of my machine. Fig. 2 is an end elevation of the same. Fig. 3 is a side elevation of the same. Fig. 4 is a vertical transverse section of the machine, the right half of the figure being taken on the line $y\,y$ of Fig. 5, while the remaining half has the portion on the left of the beater-shaft shown on the line $x\,x$ and the portion on the right of said shaft on the line $x'\,x'$ of said Fig. 5. Fig. 5 represents a longitudinal vertical section of the machine on the line $z\,z$, Fig. 4, the elevator-boot being shown separately, as in the preceding figure. Fig. 6 is an outline elevation of the machine, showing the downward extension of the elevator-boot and conductors. Fig. 7 is a diagram illustrating the course of the products through the machine under the ordinary arrangement of the conductors and elevators.

Referring to the drawings, A represents an oblong rectangular frame, usually constructed of wood, designed to sustain the various operative parts, which will be hereinafter described. This frame is to be constructed of sufficient strength and rigidity to give support to the two roller-mills which are mounted thereon, as hereinafter described, and to this end is provided with upright posts or standards $a$ at the middle.

On top of the frame A, at its middle, I mount two roller-mills, B B'—one upon each side of the frame-work. Each of these mills is of the type known in the art as a "double mill"—that is to say, a mill consisting of two independent pairs of reducing-rolls, $b\,b$ and $b'\,b'$, mounted in a common frame.

The construction of the rolls, the frame-work in which they are mounted, and of the mechanism for adjusting and driving them constitutes no part of the present invention, and may be of any ordinary or suitable character, the construction shown in either of the numerous patents hitherto granted to me for double mills being applicable in the present case.

Each of the double mills is provided with a double hopper, C, or hopper consisting of two independent compartments, one delivering its contents to each pair of rolls, so that each pair may receive a different product from the other. In each mill the product from the first pair of rolls, $b\,b$, is prevented from mingling with the product of the second pair, $b'\,b'$, by means of an intermediate board, $c$. By means of spouts $d$ and $d'$ the products from the two pairs of rolls are directed downward centrally into the bolting apparatus below—which will be hereinafter described—the spouts being arranged as shown in Fig. 5, so that the product from one pair of rolls is delivered toward one end of the machine, while the product from the other pair is delivered in the opposite direction.

As will be perceived on inspection of the drawings, the double mills B and B' are duplicates of each other, one being arranged to deliver the products to one side of the machine in the same manner that the products are delivered from the other into the opposite side of the machine.

The arrangement of details for transmitting motion to the two mills will be hereinafter described.

For the purpose of effecting the proper separation of the products delivered by the mills, I employ in the base of the machine, directly beneath the respective mills B and B', two horizontal or substantially horizontal rotating reels, D and D', each being divided transversely at its middle, as hereinafter explained, so that the two ends constitute in effect separate or independent reels, the two divided reels having consequently the same effect and capacity as four independent reels of short length, there being in effect a separate reel for each pair of reducing-rolls.

The main frame is provided with a sheathing or covering, by which it is converted into a close chamber or body to inclose the reels and confine the dust and flour therein. As shown in Fig. 4, the sheathing is applied in such manner to the two sides of the machine as to inclose the two reels independently, each reel extending from end to end of the machine, being thus inclosed in a chamber which has no direct communication with the chamber inclosing the reel on the other side of the machine. In this manner a longitudinal space or chamber is left in the middle of the frame between the two reels to receive the elevator mechanism, which will be hereinafter explained. Each of the bolting chests or chambers has converging walls at the base, and contains two horizontal conveyer-screws, F and G, one above the other, with intermediate return-boards, to effect the proper separation and gradation of the bolted products, as in other bolting-machines.

Referring now to the details of the double reels D and D', it will be seen that each consists of a central longitudinal shaft, H, provided at opposite ends with two series of blades or beaters, I, and two reel-sections, one surrounding the blades at each end of the shaft. The reel-sections consist each of a skeleton frame clothed with bolting-cloth or other pervious material, and having circular ends sustained upon supporting-rolls by which it is caused to revolve. The two reel-sections arranged concentrically constitute in action, as before referred to, two independent reels. Their inner ends are separated from each other a sufficient distance to admit of the spouts $d$ and $d'$ extending downward between them from the mill above. It will be perceived on reference to Fig. 5 that under this arrangement the products from one pair of rolls in the mill will be delivered into one reel-section or one end of the reel, while the products from the second pair of rolls in the same mill will be delivered into the other end of the reel or reel-section, the material from the respective pairs of rolls being thus delivered into the center of the reel and caused to traverse the same in opposite directions, the tailings from the two products being discharged from the reel at opposite ends of the machine. Each of the bolting chests or chambers has one end divided from the other by means of two vertical transverse partitions, $m'$, separated from each other to leave an open space between. Each reel has the inner ends of its two sections closed by heads or end boards, $e$, secured therein, these heads being provided with central openings, through which the feed-spouts $d\ d'$ deliver the material into the interior. The inner ends of the reel-sections are extended, as shown, through the vertical partitions $m'$ into the central space or chamber between them. Each section or end of the reel is clothed with bolting-cloth of two grades or degrees of fineness, the section near the inner or receiving end being of fine material, while that near the outer or tail end is of coarse material. This construction adapts each reel to separate the fine flour or middlings, which are to be removed immediately from the machine, from the coarser middlings, which are to undergo further treatment. The two conveyers F and G, arranged under each reel-section, as before described, and as plainly represented in Figs. 4 and 5, admit of the fine and coarse products being kept separate from each other and delivered through separate openings in the base of the machine, as indicated by the arrows in Fig. 5. The arrangement of these conveyers and the mode of effecting the separation of the materials recited above are the same as in the ordinary bolting-chests, and are familiar to those skilled in the art. The conveyer and the reel-shaft are respectively extended through the heads or boards $e$ and partitions $m'$ across the intermediate space or chamber, so that the driving-power may be applied wholly at one end of the machine.

The manner of constructing the frame-work of the reel and of sustaining and driving its ends constitutes no part of the present invention, being essentially the same as that represented in my Letters Patent No. 278,702.

While I have described above the details of but one of the double reels, it is to be understood that the corresponding reel in the opposite side of the machine is constructed and arranged in like manner to receive the products from the mill upon that side of the machine.

For the purpose of conducting the materials in the required manner from the respective reel-sections to the various rolls, I employ at the middle of the machine two elevator-belts, and in connection therewith spouts at the base to deliver the material to them, and spouts at the top to conduct the material therefrom to the hoppers of the rolls.

As plainly represented in Figs. 4 and 5, the two elevators K and L, consisting of belts provided with buckets, as usual, are mounted vertically in the center of the machine and extended downward between the two reels, being carried at their lower ends by pulleys M and M', and at their upper ends by pulleys N and N', the belts passing through suitable spouts or trunks, as usual. The two elevators are separated from each other by an intervening partition and operate independently. The lower ends or boots of the two elevators are carried downward below the frame, and are supplied with material through spouts O, leading upward and outward beneath the respective reels in position to receive the coarse middlings passing through the reel, or to receive the tailings, as may be demanded. At their upper ends the elevators are provided with spouts P, to deliver the products to the respective mills. The spouts at the top and bottom may be varied in arrangement, so as to deliver one or another of the products to each mill, according to the requirements of the particular process to be carried out. The spouts arranged as shown in the drawings will cause the material to pursue the course indicated in Fig. 7.

Inasmuch as the particular course of treatment involved is not claimed and may be modified, it is deemed unnecessary to give the same in detail herein, further than to say that the respective products follow the course indicated by the arrows, and that the full lines indicate the course of the material which passes over the tail of the reel, while the broken lines indicate the course of the material which is delivered through the reel. It is to be noted that this plan is designed to illustrate simply the general mode of action of the machine, and that the clothing of the various parts and the arrangement of the spouts may be modified to carry out various systems of reduction now commonly practiced. The elevators receive motion from a sprocket-wheel, Q, applied to the shaft which carries the upper wheels, N N', and connected by a chain, R, with a sprocket-wheel applied to one of the roller-shafts. The spouts may be arranged in such manner as to cause the material to pass through the machine in regular course from each reel to the next pair of rolls; or they may be arranged in any other suitable manner, according to the character of the treatment which the material is to receive and the order in which it is to be subjected to the various reductions and separations. It is ordinarily preferred to have the tailings of the products from each mill passed to the next mill in the series, each mill being adjusted to effect a somewhat finer reduction than the one by which the material was previously treated.

Passing now to the details of the mechanism for imparting motion to the various parts, it will be perceived that the mills B and B' are arranged with the axes of their corresponding rolls in line, and that the rolls in each mill are connected by means of intermediate shafts, $N^2$, as shown in Figs. 1, 2, and 4, to the journals of the corresponding rolls in the opposite mill, so that motion imparted to a roll in one mill will be imparted therefrom through the intermediate shaft to the corresponding roll of the other mill. It will be observed that the shafts $N^2$ are bored out or provided with sleeves to receive the journals of the rolls and connected thereto by transverse pins, allowing a swiveling or universal action between them, so as to prevent the parts from binding or cramping in the event of the rolls being thrown out of line. On one side of the machine two of the rolls of mill B are provided with pulleys O' and P'. Below these pulleys a shaft, Q', extending transversely through the machine, carries on one end a pulley, R'. A driving-belt, S, passes upward partly around the pulley R', thence over the roll-pulleys O' and P', and downward to a driving wheel or pulley located at any suitable point below. This arrangement causes motion to be imparted to one roll of each pair in the mill B, this motion being transmitted to the corresponding rolls of the opposite mill, B', by the intermediate shafts, $N^2$, as before explained. The two remaining rolls in the mill B receive motion from the mill B' on the opposite side of the machine.

As shown in Figs. 2 and 4, two rolls of the mill B' are provided with pulleys T and U, which are driven through intermediate belts by corresponding pulleys, V and W, mounted on the end of the cross-shaft Q', before mentioned. The motion thus communicated on one side of the machine to the two rolls of mill B' is transmitted by the intermediate connections to the corresponding rolls of mill B on the opposite side. In this manner motion is communicated to the four pairs of rolls, one roll in each pair being driven from one side of the machine, while the companion roll in each pair is driven from the opposite side, this arrangement securing an equalization of the strain upon the main frame and other working parts, and insuring a better action than is otherwise attainable.

The transverse counter-shaft Q', before referred to, is extended through the machine between the inner ends of the reel-sections, as shown in Figs. 3, 4, and 5, and is mounted at its ends in vertically-adjustable boxes X, seated in guides in the main frame and adjusted by means of set-screws Y.

For the purpose of transmitting motion to the two reels, their shafts are extended at one end of the machine and provided with pulleys $k$, which are connected by belts $l$ with driving-pulleys $m$ on a transverse shaft, $n$, extending across the end of the machine near the base, and seated in bearings on the main frame. This shaft $n$ receives motion by a pulley, $o$, upon its end through a connecting-belt, $p$, from a pulley, $q$, on the main transverse shaft Q', before mentioned.

To prevent the shaft $n$ from cramping or binding in its bearings in the event of its ends being thrown out of line, it is divided at the center and its two parts connected by an ordinary clutch-coupling, $r$, which permits a slight swiveling action between the parts. This clutch also avoids the necessity of unbolting and removing the shaft, and, in the event of its being required, to separate the two sides of the machine from each other, as may sometimes be required in the course of shipment. Each hopper of the grinding-mills contains in its throat or mouth a feed-roll, $a''$, as usual. These rolls receive motion, as represented in Figs. 2 and 4, by means of sprocket-wheels, $b''$, applied at their outer ends, and connected by chains $c''$ with corresponding pulleys, $d''$, applied to the journals of the grinding-rolls or to the connecting-shafts $N^2$.

The manner in which the conveyers F and G receive motion is illustrated in Figs. 3 and 5. The two companion conveyers on one side of the machine are provided, respectively, with gear-wheels $g'$ and $h'$, engaging with each other. A sprocket-wheel, $i'$, applied to the shaft of the upper conveyer, is connected by a chain or belt, $j'$, with a driving-pulley, $k'$, applied to the protruding end of the beater-shaft H, motion being by this arrangement communicated from the beater shaft to both conveyers. A like arrangement of parts will be used on the opposite side of the machine to transmit motion from the beater-shaft on that side to the two conveyers thereunder.

The two sides of the machine being duplicates of each other, it is deemed unnecessary to give a separate illustration in the drawings of the second set of conveyer-driving devices.

By the expression "roller-mill" as used in this application is meant a mill consisting of two co-operating rolls, and by the expression "double roller-mill" is meant a mill containing two pairs of such rolls.

Having thus described my invention, what I claim is—

1. As an improvement in the construction of gradual-reduction machines, the combination of a main frame inclosed to form a bolting chest or chamber, a horizontally-divided reel therein, a double roller-mill located upon said frame midway of its length, and conductors, substantially as described, to deliver the products from the respective pairs of rolls to the inner or central ends of the reel.

2. In combination with the inclosing chest or body, the horizontal centrally-divided reel, the corresponding conveyers thereunder, and the roller-mill centrally located on top of the body or chest, said mill provided, as described, with two independent pairs of rolls, independent hoppers, and independent delivery spouts or conductors extending downward and communicating centrally and directly with inner or central ends of the reel.

3. In combination with a bolting chest or chamber, a horizontal reel transversely divided at its center, walls or partitions $m'$, the roller-mill centrally located on top of the chamber, a transverse shaft, $Q'$, extending through the chamber between the two ends or sections of the reel, and driving mechanism, substantially as shown, connecting said shaft with the mill, whereby the use of the transverse shaft is permitted without interference with the action of the reel.

4. In combination with the centrally and transversely divided reel, the double roller-mill located directly above the point of division, the conductors from said mill extending directly downward into the opening or division, the transverse driving-shaft $Q'$, extending through the opening or division below the conductors, and the system of driving belts and pulleys, substantially as described, connecting said shaft $Q'$ with the rolls of the mill above, whereby the use of said driving-shaft is permitted without interference with the reel or with the conductors.

5. In a gradual-reduction machine, the combination of the main frame or body A, having its sides inclosed to form independent bolting-chambers, a horizontal transversely-divided reel located in each of said chambers, two double roller-mills located on each side of the machine midway of its length, and conductors, substantially as described, leading from the respective pairs of rolls into the inner or central ends of the reels.

6. In a gradual-reduction machine, the combination of the two transversely-divided reels, the driving-shaft $Q'$, extending transversely through the central openings in the reels, and the transverse shaft $n$, belts and pulleys connecting said shaft with the driving-shaft $Q'$, and also with the two reel-shafts, independently of each other.

7. In combination with the two reels provided with pulleys $k$, the two roller-mills having their axes at right angles to the reels, the shafts $Q'$ and $n$, both at right angles to the reels, and the belts and pulleys, as specified, connecting the shaft $Q'$ with the shaft $n$, and the latter with the reel.

8. In combination with the body or chest divided, as described, into two independent bolting-chambers, the longitudinal transversely-divided reels mounted in said chambers, the double roller-mills located above and communicating centrally with said reels, and the elevator-belts extending vertically between the two bolting-chambers and communicating by feed-spouts with the respective mills.

9. In combination with the main frame centrally divided into two bolting-chambers with a space between them, the longitudinal reels mounted in said chambers, the roller-mills located above the reels, and an elevator mounted upon the main frame between the mills and extending downward between the respective reels, substantially as described.

WILLIAM DICKSON GRAY.

Witnesses:
 ALBERT HOPPIN,
 CHARLES ALLIS.